United States Patent Office 2,755,660
Patented July 24, 1956

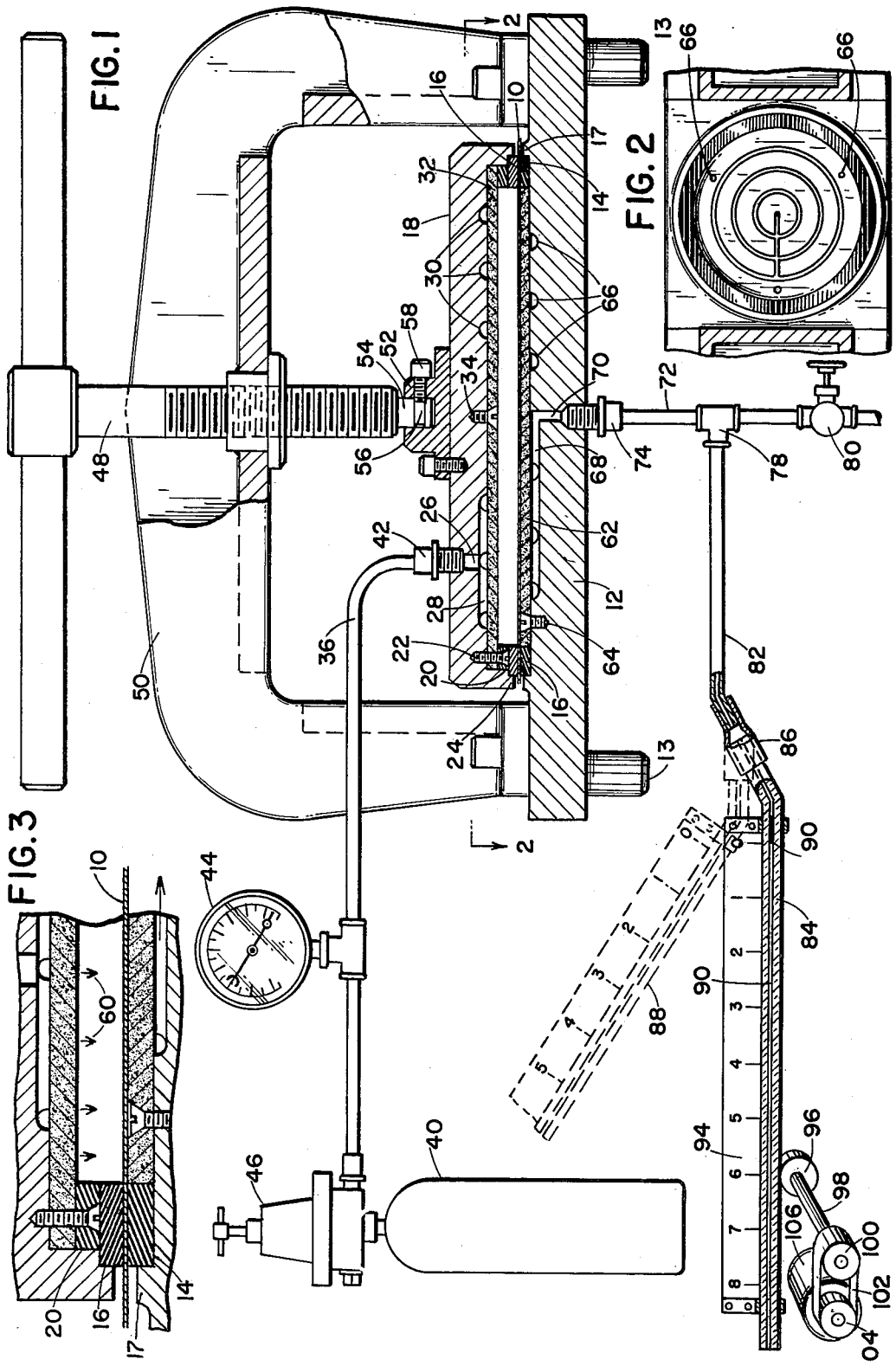

2,755,660

PERMEABILITY TESTER

Karl Kammermeyer, Iowa City, and David William Brubaker, Cedar Rapids, Iowa, assignors, by mesne assignments, to State University of Iowa, Iowa City, Iowa Application June 12, 1953, Serial No. 361,202

6 Claims. (Cl. 73—38)

This invention relates to improvements in apparatus for measuring rate of gas permeation through a membrane of test material.

Elastomeric materials have become of paramount importance in a great variety of industrial and domestic applications. This is illustrated by the extended use of plastics in the form of film as well as coated cloth and paper in industries such as package industries, clothing industries, frozen food industries, manufacture of balloons, etc. It has therefore become important to devise ways of testing these materials and increasing demands have been made for improved apparatus for determining the gas permeability of these sheet materials. In production testing of these materials it of course is essential that a testing machine be safe and fool-proof to operate and give accurate readings. It is further important that its operation be simple and rapid.

It is accordingly an object of the invention to provide an improved permeability tester for rapidly determining the rate of permeation of a gas through a sheet of material.

Another object of the invention is to provide a permeability testing device in which a sample of sheet material can be quickly and easily clamped and subjected to a constant-temperature, pressurized fluid and the rate of permeation of the fluid through the material measured.

A further objective of the invention is to provide an apparatus for testing the permeability of gas through a sheet of material which will accurately indicate the rate of gas permeation through the material and which is easily read by the operator and which makes it unnecessary to subject the specimen to gas for a long period of time to obtain an accurate reading.

Other objectives and advantages will become apparent throughout the following specification taken in connection with the appendixed drawings in which:

Figure 1 is the side elevation of the permeability testing apparatus with certain portions in section to enhance the clarity of the drawing;

Fig. 2 is a sectional view which is taken along line 2—2 of Fig. 1 and which is reduced in size; and, Fig. 3 is an enlarged view of a portion of Fig. 1 illustrating the action of the gas permeating through the test material.

The apparatus is shown in use in Fig. 1 with the sheet or membrane of material 10 to be tested being clamped in the machine and subjected to a fluid pressure. The pressure is applied on one side of the material and the amount which leaks or permeates through is collected and accurately measured, thereby giving a permeability rating to the material.

The material is clamped to be positioned between upper and lower porous disks 32 and 62. A supporting base or plate 12 is provided with legs 13 at the corners for supporting the testing machine. On its upper surface the base or plate 12 carries a round steel porous disk or plate 62 which fits inside a lower annular metal ring 14 held in place by a raised flange 17 on the base 12 (see Figs. 1 and 3). Mounted on an upper plate 18 above the ring 14 is an annular rubber gasket 16 which is of the same size and shape as the metal ring. The specimen of the material to be tested rests on this ring 14 and is pressed thereagainst by the rubber gasket 16 carried on the upper plate 18 which also carries at its edge an annular steel ring 20 just above the gasket. The ring is secured to the plate by screws 22 and is positioned within a flange 24 around the edge of the upper plate. The gasket 16 is suitably cemented to the ring 20.

It will be noted in Figs. 1 and 3, that as the upper plate is pressed down against the lower plate the material is clamped around its outer edge between the rubber gasket 16 and the steel ring 14 carried on the base 12. This holds the material firmly and prevents air from leaking out between the plates. The material is held in this position and air pressure is applied to its upper surface which will cause the air to leak through the material at a rate proportional to the permeability of the material.

To apply air to the upper surface of the material a passageway 26 leads through the plate to a connecting space 28 which connects together a series of annular grooves 30. The grooves serve to distribute the air pressure around the entire inner plate surface.

The inner face of the plate is covered by a porous disk 32 which may be made of a material such as porous stainless steel. This disk acts as a diffuser and prevents damage to the test sheet when air pressure is suddenly admitted through the opening 26. The disk is held in place by the steel ring 20 which clamps against its outer edge and by a screw 34 which helps support it at its center.

Thus it will be seen that as pressurized air is admitted through the passageway 26 it passes into the opening 28 and is distributed around the plate by means of the grooves 30. The pressurized air then passes down through the porous disk 32 to be applied to the upper surface of the sheet of material 10.

For supplying air to the upper plate an air line 36 leads from a compressed air cylinder 40 and is connected to the plate by means of a fitting 42. A pressure gauge 44 is in the line to indicate the pressure supplied to the plate. A reducing valve 46 is provided so that the pressure supplied to the plate may be kept constant and may be controlled to obtain the pressure desired. A thermometer, not shown, may be provided to indicate the temperature of the surrounding air. Since the passage of air through the material is proportional to its density, the temperature is a factor which must be taken into account. However, it may be assumed that tests will be made at constant temperature and a temperature control is therefore not shown.

As air pressure is applied to the upper plate a considerable pressure forces upwardly on the plate. To prevent leakage of air from around the edges of the plate, it must be held down firmly so as to press the material tightly between the steel ring 14 and the upper gasket 16. For the purpose of pressing the upper plate down tightly and for removing it at the conclusion of a test the plate is supported at the lower end of an adjustable vertical shaft 48. The shaft 48 is threaded into the center of a yoke 50. The ends of the yoke are bolted to the base plate 12. A cross rod is attached to the top of the vertical shaft to obtain leverage for manually tightening the press.

The connection between the vertical shaft 48 and plate 18 is non-rigid so that on tightening, the vertical shaft may rotate independently of the plate. In addition the plate can tilt slightly to conform to the material. A hub 52 is bolted to the center of the upper plate and has a bore in its top into which the tip 54 of the vertical shaft protrudes. The tip has an annular groove 56 at its lower end into which a stud 58 protrudes to prevent the upper plate from falling off the end of the vertical shaft. This also permits lifting of the top plate when the vertical shaft is screwed upwardly as is done after each test is made and the sample is to be removed.

Thus it will be seen that a sample may be removed by rapidly screwing up the vertical shaft and a new sample inserted by placing it between the plates and screwing the single shaft downwardly. Since the shaft engages the top plate at its center and the plate is non-rigid with respect to the shaft, the material specimen will be clamped with an even pressure around its edge.

Returning now to the test, as pressurized air is admitted into the upper plate it fills the concave area at the center of the plate and forces the sheet of test material downwardly, the air affecting its pressure in the direction indicated by the arrows 60 of Fig. 3. The sheet of material is forced down against the porous disk 62 which is carried by the lower plate 12. This porous disk is similar to the upper disk 32 in that it is also formed of a material such as porous stainless steel and permits the passage of air. The disk is positioned within the annular ring 14 which sets within the steel flange 17 of the lower plate and the disk is held in place by screws 64 threaded into holes 66 in the lower plate, see Fig. 2. The porous disk 62 serves as a support for the test material as the air pressure bears against the other side. It provides a smoother supporting surface and yet does not interfere with the leakage of air through the test specimen.

As the pressurized air permeates through the specimen of material 10 it passes through the porous disk 62 and is collected in the annular grooves 66 which extend around the lower base plate 12. The grooves are connected by a groove 68 which connects to a center passageway 70.

This lower passageway 70 leads to a pipe 72 which is connected to the passageway by a fitting 74. This pipe leads to a T 78, one branch of which connects to an air vent valve 80 which opens to atmosphere. Opening the valve 80 vents the area on the under surface of the test specimen. Thus with the valve 80 open to atmosphere the pressure differential between the upper and lower surface of the test specimen is indicated directly by the gauge 44 which reads in atmospheric pressure.

The other branch 82 of the T 78 leads to the transparent capillary tube 84 which functions to indicate the rate at which the air permeates through the specimen. The capillary tube is connected to the pipe 82 by a flexible connector 86. This flexible connector permits raising the capillary tube toward vertical position as is indicated by the dotted line position 88 in Fig. 1.

Within the transparent capillary tube is a slug of indicating liquid 90 such as mercury. It will be evident from the drawing that when the valve 80 is closed, the air which passes through the membrane of test material must, in order to escape, pass out through the capillary tube forcing the slug of mercury 90 ahead of it.

The size of the bore 92 through the capillary tube is determined by the type of material which is to be tested. That is, for testing a sheet of material which has a high permeability factor which will cause the air to leak through it rapidly, the bore must be larger so that the slug will not move through the tube too rapidly. For a sheet of material of a lower permeability a capillary of smaller diameter may be used thus requiring less air to the slug to move the slug along the length of the capillary. The maximum diameter for practical use is reached when the mercury will no longer fill the cross section of the capillary. When this point is reached the area of the material tested may be reduced by reducing the size of the clamping plates thus reducing the amount of air which will permeate per unit of time. Also, the capillary tube diameter cannot be too small or the friction of the mercury will be too high relative to the area presented to the air and accuracy will be impaired.

For observing the rate of travel of the mercury slug along the capillary tube a linear gauge 94 is attached thereto. The gauge is in the form of an indicator plate having evenly spaced numerals thereon reading from right to left in the present illustration. For observing the rate of movement of the mercury slug its movement may be timed as it moves from the zero index toward point 8.

An important feature of the invention is the means provided to reduce the resistance offered to the mercury by the capillary tube. As the air leaks through the material tested and forces the slug of mercury ahead of it, ideal circumstances would require that there is zero resistance to the movement of the mercury slug. Thus the air pressure in the tube behind the slug always tends to equal the slug's resistance to being moved which is a constant. This of course will give a uniform rate of travel of the mercury slug since the air will leak through the sheet of material at an even rate under a constant pressure differential.

To reduce the friction between the capillary tube and the mercury slug to a negligible amount, the present invention contemplates imparting a continual vibration to the capillary tube.

Apparatus for accomplishing this is shown in the present preferred embodiment in the form of an eccentric disk 96 supporting the capillary tube. As the disk rotates its eccentric movement will cause rapid up and down movements or vibrations of the capillary tube, which has the effect of greatly reducing the surface friction offered by the bore of the tube. The disk 96 is mounted on a shaft 98 rotated by pulley 100 which is driven by belt 102. The belt is driven by pulley 104 on the drive motor 106.

At the end of a test when the mercury slug has moved to the left end of the capillary tube, the test specimen is removed from between the clamping plates and the indicating capillary slug is reset to zero. To accomplish this the vent valve 80 is opened and the end of the capillary tube is lifted toward the dotted line position 88. The weight of the slug of mercury causes it to flow back to the zero point of the scale. As it moves it forces air within the tube ahead of it which passes out through the open vent valve 80.

Thus it will be seen that we have provided a device which accurately measures the rate of gas permeation through a membrane. The rate of permeation is constant under contant temperature and pressure conditions and the indication is manifested at a constant rate and may so be read.

The apparatus shown in the preferred embodiment is simple in construction and relatively fool-proof to operate. The material to be tested is rapidly and easily clamped or removed from between the pressure plates. The device may be readily adapted to the testing of various types of material and meets the objectives set forth earlier in the specification.

While the permeability tests are described as being made with air it will be recognized that fluids or gases of various types and derivatives may be readily used. Air is usually preferred because of the factors of economy and safety which it possesses.

We have, in the drawings and specification, presented a detailed disclosure of the preferred embodiments of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. An apparatus for testing the permeability of a material which comprises means to apply a fluid under constant pressure to an area on one side of the material, means to collect the fluid which passes through an area of the material, a horizontal capillary tube connected to the collecting means so that the fluid will pass through the tube, a small slug of material filling a cross sectional area of the tube so the slug will be pushed ahead of the fluid as it passes through the tube, the material being visible through the tube, and a scale adjacent the tube to measure the length of travel of the slug for a given length of time to determine the rate of travel of the slug and to thereby determine the permeability of the material, said capillary tube being level so that the weight of said slug will offer no resistance to being pushed by the fluid.

2. An apparatus for testing permeability of a material comprising means to apply a fluid under constant pressure to an area on one side of the material, means to receive the fluid which passes through the material on the opposite side of the material, a level horizontal tube connected to the receiving means so that the fluid must pass through the tube to escape, a slug of material filling a small portion of the tube so that the slug must be pushed ahead of the fluid as it passes through the tube, the slug normally positioned in the end of the tube which is connected to the receiving means, means to vibrate the tube in a lateral direction so that the friction between the slug and the tube walls will be reduced and the rate of travel of the slug through the tube will be wholly dependent upon the passage of fluid through the material, and means for indicating the length of travel of the slug through the tube so that the rate of travel may be determined and the rate of passage of fluid through the material and the permeability of the material may be determined.

3. An apparatus for testing the permeability of the material comprising means for enclosing an area on one side of the material, means for applying a fluid under pressure to the enclosed area so that the fluid will leak through the material at a rate proportional to its permeability, means for collecting the fluid which passes therethrough at the other side of the material, a level horizontal capillary tube open at one end and connected at the other end to the collecting means, a slug of material filling a cross sectional area of the tube and normally positioned at its connected end so that the fluid must push the slug ahead of it as it escapes through the tube, an eccentric vibrator positioned beneath the tube to cause a rapid lateral vibration thereof, and means to drive the vibrator to vibrate the tube and reduce the friction between the slug and the inner walls of the tube to a negligible amount, the speed of movement of the slug along the tube indicating the rate of fluid leakage through the material and the premeability thereof.

4. An apparatus for testing the permeability of a material which comprises a plate having an area which covers one side of a membrane of a material to be tested, a flanged gasket around the edge of said area, means to apply a fluid pressure through the plate to said area, a mating plate covering an area on the opposite side of the material with a cooperating gasket positioned to engage the material opposite the gasket of the pressure plate, means to force the two plates together to clamp the test material therebetween, a passageway leading from the collecting plate to receive the fluid which passes through the test material, a level horizontal capillary tube being open at one end and being attached at the other end to said passageway so that the fluid passing through the membrane must escape through the capillary tube, and a small slug of liquid filling the cross section of the capillary tube so that it must be moved ahead of the fluid which escapes through the membrane and passes therethrough, means to continuously vibrate the capillary tube while the membrane is subjected to pressure so that the friction between the slug of liquid and the capillary wall will be reduced, and a scale adjacent to the capillary tube so that the speed of movement of a liquid slug can be observed and the permeability of the membrane can be determined.

5. An apparatus for testing the permeability of a material comprising means to apply a constant pressure fluid to an area on one side of the material, means to collect the fluid from an area on the opposite side, a level horizontal capillary tube leading to the collecting means and provided with an indicating slug so that fluid which passes through the capillary must push the slug ahead of it at a speed proportional to the rate of passage of fluid through the material, means to return the slug to its starting position after the test and a vent valve positioned between the capillary and the collecting means and leading to atmosphere so that it may be opened to expose the collecting means to atmospheric pressure before a test and permit the escape of air for returning the slug to its starting position after the test, the valve being closed to atmosphere during the test.

6. An apparatus for testing the permeability of a material comprising means for applying a fluid under constant pressure to an area on one side of the material, means to collect fluid which passes through the area of material, a horizontal capillary tube connected to the collecting means so that the fluid passing through the material will pass through the tube as it leaves the collecting means, a slug of material within the capillary tube so that as the fluid escapes it will push the slug ahead of it along the capillary tube, and a non-rigid connection between the capillary tube and the collecting means so that the tube may be pivoted from horizontal to vertical position to move the slug to the connected end of the capillary tube at the beginning of a test.

References Cited in the file of this patent

UNITED STATES PATENTS

| 1,174,251 | Hankins et al. | Mar. 7, 1916 |
| 2,458,101 | Rothfus | Jan. 4, 1949 |
| 2,498,198 | Beeson | Feb. 21, 1950 |
| 2,509,142 | Getchell | May 23, 1950 |
| 2,604,779 | Purcell | July 29, 1952 |
| 2,618,151 | Leas | Nov. 18, 1952 |
| 2,705,418 | Reichertz | Apr. 5, 1955 |

FOREIGN PATENTS

| 16,770 | Great Britain | July 13, 1910 |
| 831,610 | Germany | Feb. 14, 1952 |

OTHER REFERENCES

National Bureau of Standards, R. P. 681, vol. 12, May 1934, pages 567 to 573 and Figure 1.

Article, "Mercury Slug Flowmeter," by Yudowitch, Analytical Chemistry, vol. 20, 1948, page 86.